United States Patent [19]

Mathews

[11] 3,753,340

[45] Aug. 21, 1973

[54] MOWER WITH EASY DISCHARGE GRASS CATCHER

[76] Inventor: Bernard C. Mathews, P.O. Box 70, Crystal Lake, Ill. 60014

[22] Filed: Jan. 10, 1972

[21] Appl. No.: 216,413

[52] U.S. Cl. .......................... 56/200, 56/205, 56/504

[51] Int. Cl. .......................... A01d 35/22

[58] Field of Search .......................... 56/12.7, 16.6, 194, 56/198, 199, 200, 205, 206, 294, 504, 505

[56] References Cited

UNITED STATES PATENTS

| | | | |
|---|---|---|---|
| 3,493,987 | 2/1970 | Longnecker | 56/16.6 X |
| 439,806 | 11/1890 | Miller et al. | 56/200 |
| 2,999,346 | 9/1961 | Mathews | 56/505 X |
| 3,135,080 | 6/1964 | Christiansen | 56/203 X |
| 3,138,909 | 6/1964 | Williams et al. | 56/16.6 X |
| 2,989,833 | 6/1961 | De Fino | 56/16.6 |
| 283,415 | 8/1883 | Passmore | 56/199 |
| 601,008 | 3/1898 | Trisler | 56/199 |
| 2,920,433 | 1/1960 | Brady | 56/504 X |

*Primary Examiner*—Louis G. Mancene
*Assistant Examiner*—J. A. Oliff
*Attorney*—Zabel, Baker, York & Jones

[57] ABSTRACT

A flail type rotor assembly is journalled in side plates. A housing over the rotor was an outlet leading into a vertical chute formed by a front wall and a baffle. A grass catching receptacle is pivotally suspended from the upper part of the side walls. The upper part of the front wall is curved to deflect grass clippings rearwardly into the receptacle. By rocking the receptacle, the bottom edge moves away from the housing to empty itself. A gate for the outlet may be closed for alternative operation in which the clippings are returned to the ground. The front wall is cut away in front of the gate. Paddles on the drum help create the air stream which blows the clippings upwardly.

11 Claims, 5 Drawing Figures

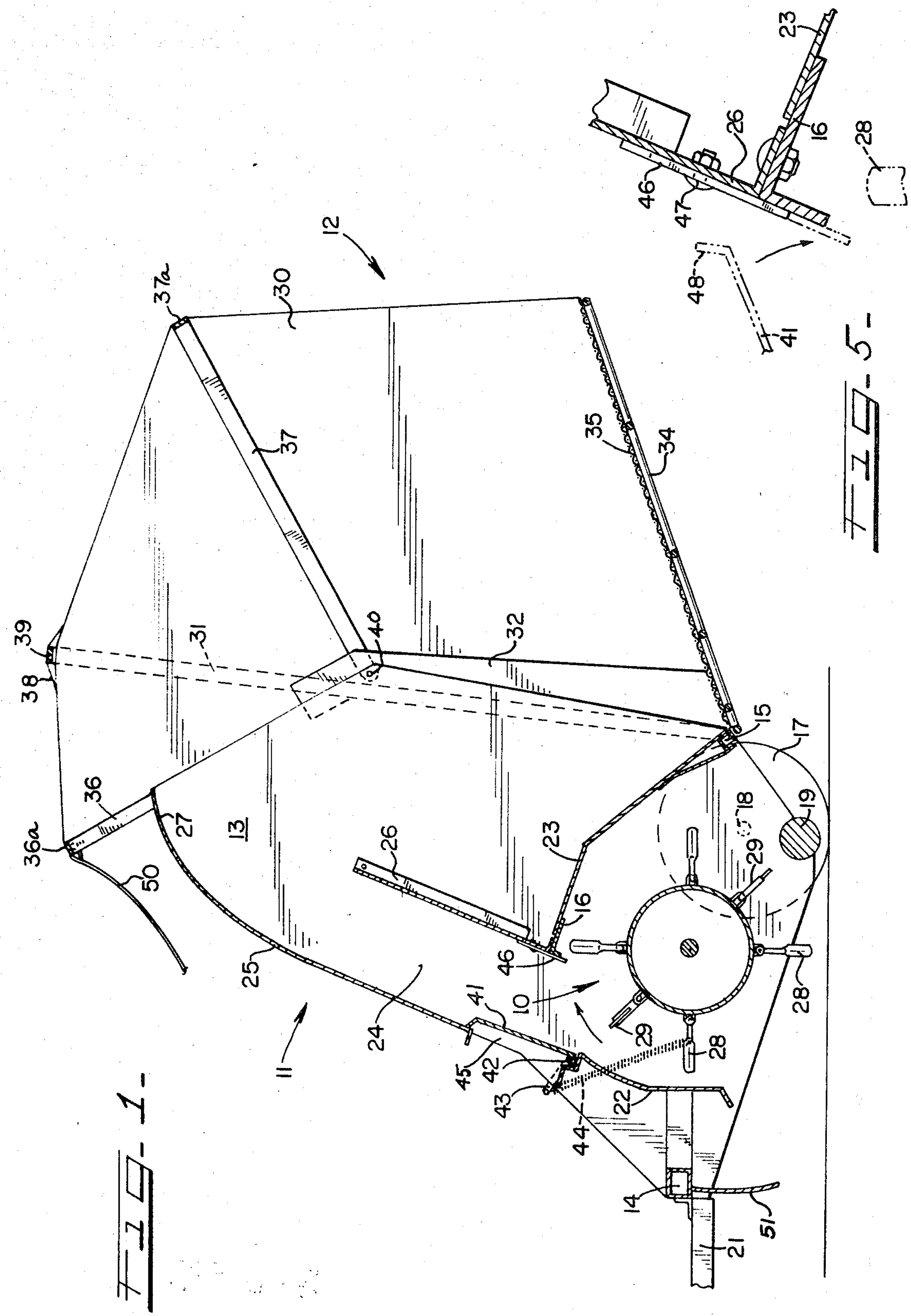

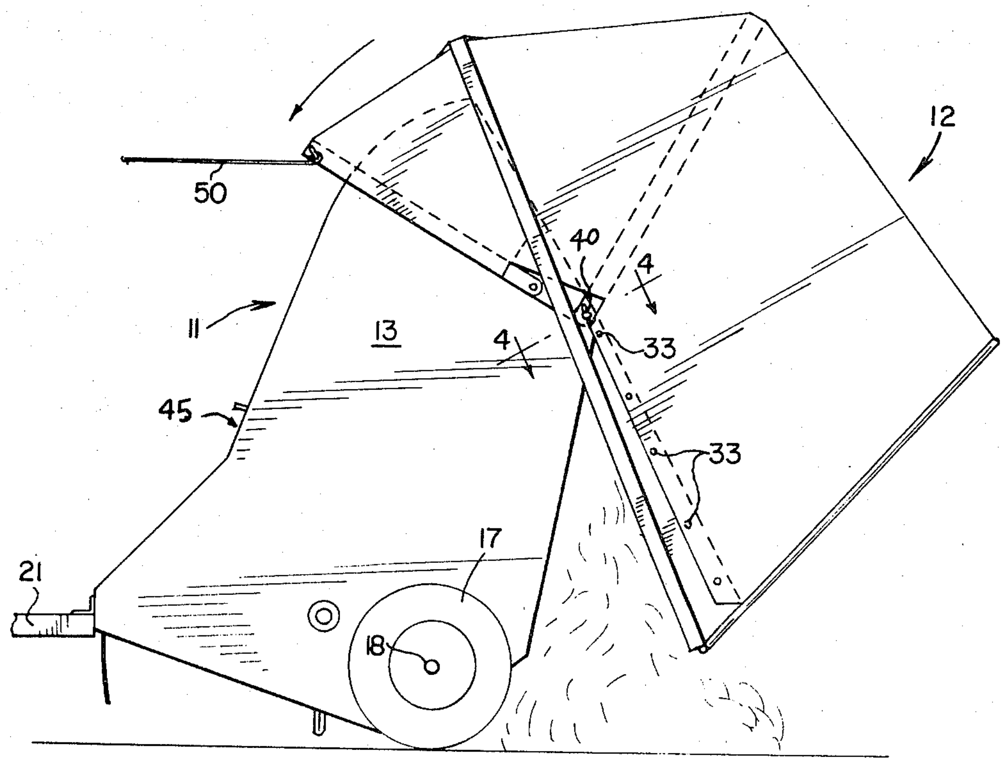
Fig-2-
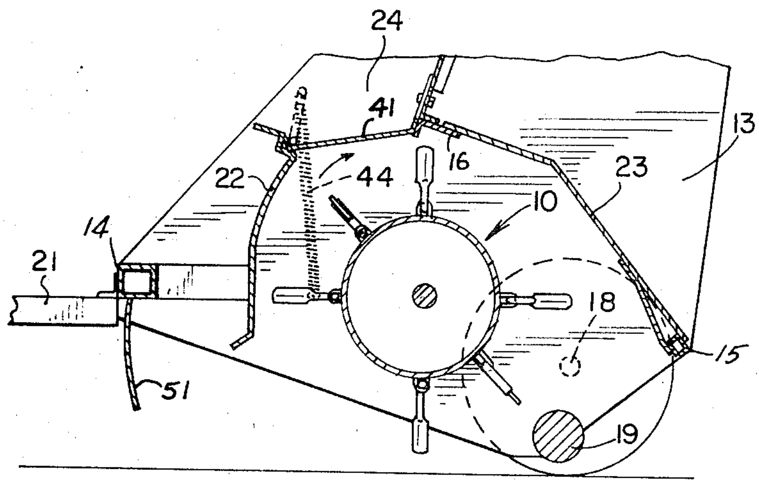
Fig-3-
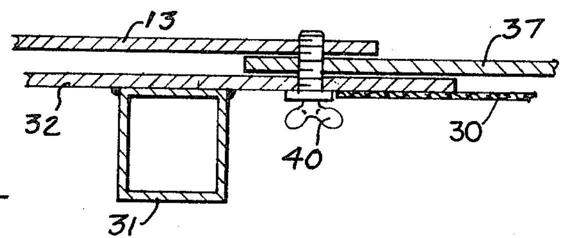
Fig-4-

MOWER WITH EASY DISCHARGE GRASS CATCHER

My invention relates to a mower having a large capacity grass catching receptacle which is arranged for easy discharge of the grass clippings received therein.

Various grass catcher arrangements have been proposed in which the grass catcher has been pivotally mounted to facilitate discharge of the grass clippings contained therein. However, these prior art arrangements require a lifting of the mass of grass clippings which is not practical in a large capacity grass catcher in which the weight of the clippings may be of the order of one or two hundred pounds or even more when the grass is wet.

According to my invention, I provide a mower and grass catcher combination in which the grass catching receptacle is pivotally mounted toward its upper portion so that it can be lifted to provide a discharge at the bottom of the receptacle. More specifically, by rocking the pivoted receptacle, the grass slides out of the bottom by gravity, without any appreciable amount of lifting. Furthermore, the arrangement is such that gravity maintains the receptacle in the closed position without the necessity of a latch.

Furthermore, I am enabled to use a large capacity grass catcher due to the fact that I provide a horizontal axis rotor type mowing element which also acts as a blower to throw the clippings upwardly toward the top of the grass catcher, from which they drop down toward the bottom. Thus, the grass catcher can have a much greater vertical dimension than in the usual arrangement in which the mowing element discharges into the grass catcher in a horizontal direction.

My improved mower also operates as a leaf sweeper and chopper enabling it to pick up a much greater quantity of leaves before emptying than an ordinary leaf sweeper which does not chop.

Another feature of my mower is that the grass catcher can easily be removed and the mechanism adjusted to return the chopped grass clippings to the ground for mulching.

Other objects, features and advantages will become apparent as the description proceeds.

In the drawings:

FIG. 1 is a sectional elevation of a preferred embodiment of my invention;

FIG. 2 is a side elevation showing the receptacle in its discharge position;

FIG. 3 is a fragmentary view similar to FIG. 1, but showing the gate in its closed position;

FIG. 4 is a detail section taken along the line 4—4 of FIG. 2; and

FIG. 5 is an enlarged detail showing the deflector plate in a changed position.

The mower comprises a flail type rotor assembly 10, a supporting structure 11 for the rotor assembly, and a grass catching receptacle 12 which is pivotally mounted on the supporting structure 11.

The supporting structure 11 comprises a pair of side plates 13 which are connected to each other by suitable cross members including a front cross rail 14, a rear cross rail 15, and an intermediate cross member 16 in the form of an angle. The supporting structure 11 is mounted on suitable rubber tired wheels 17 which are located exteriorly of the side plates 13 and are mounted on stub shafts 18 which are adjustably mounted on the side plates 13 by conventional means, not shown. An antiscalping roller 19 is suitably journalled in the side plates 13.

The rotor 10 is journalled in the side plates 13 and is driven in the direction of the arrow by suitable means, not shown, such as a gasoline engine or a power take-off from the tractor. A draw bar 21 extending forwardly from the supporting structure 11 permits the mower to be pulled by a tractor.

A sheet metal front housing part 22 and a sheet metal rear housing part 23 extends from one side plate to the other to provide a housing for the rotor 10. The space between the front and rear housing parts provides an opening into an upwardly extending chute 24 which is formed by a front wall 25 and a rear wall 26 in the form of a sheet metal baffle, both of these elements extending from one side plate 13 to the other. The upper portion of the front wall 25 is curved rearwardly at 27 to deflect grass clippings rearwardly into the receptacle 12.

The rotor is provided with a plurality of blades 28 arranged in four rows. Preferably the blades are of the rod stock type shown in my copending application filed Jan. 3, 1972, Pat. No. 3,693,335, granted Sept. 26, 1972, and entitled "Flail Type Rotor Assembly and Blade for Same" to which reference is hereby made. When blades of this type are used, it is desirable to provide paddles 29, as described in the aforesaid copending application, in order to create the air stream which blows the grass clippings upwardly through the chute 24 into the receptacle 12.

The receptacle 12 is preferably a canvas receptacle in which the top and side canvas walls 30 are supported by a metal framework. In the embodiment shown, the framework comprises a pair of substantially vertical tubular structural members 31, one at each side. Secured to each tubular element 31 is a plate 32 providing a surface to which the canvas 30 can be secured by suitable snap fasteners 33.

The framework also includes a grid-like structure 34 having a plurality of transversely extending bars supporting a screen 35 which constitutes the bottom wall of the receptacle 12.

A U-shaped front stay 36 and a U-shaped rear stay 37 are secured at their lower ends to the plate 32 and include transverse cross members **36*a* and 37*a*. The top wall portion of the canvas 30 has a transverse pocket 38. A cross member 39 removably secured to the upper ends of the two tubular members 31 passes through the pocket 38. Thus, the canvas receptac'e is maintained in the shape shown by the cross members 39, 36*a*, and 37*a*. The upper front edges of the canvas side and top walls are suitably secured to the front stays 36 and cross member 36*a* by a hem or stitching, and the lower edges to the bottom wall grid 34** by suitable clips, not shown.

The receptacle 12 is pivotally mounted on the side plate 13 by pivots 40 in the form of thumb screws shown in FIG. 4. Thus by removing the thumb screws, the receptacle 12 can be removed from the side plates in the event that it is desired to operate the mower without the grass catcher.

As shown in FIGS. 1 and 3, a gate 41 secured to a shaft 42 can be lowered from the FIG. 1 position to the FIG. 3 position to close the chute 24 when it is desired to return the clippings to the ground for mulching. A lever 43 connected to the shaft 42, and an over center spring 44 serves to maintain the gate in either its open or closed position. It will be noted that there is a gap 45 between the front housing part 22 and the front wall 25 which prevents clippings from packing into the space in front of the gate 41 when it is in the FIG. 1 position.

An adjustable deflector plate 46 is mounted on the baffle 26 by means of screws 47. For operation with the receptacle, the deflector plate 46 is moved downwardly into the dotted line position shown in FIG. 5 where it is close to the path of the tips of the blades 28, in order to minimize that portion of the air stream and entrained clippings which tends to by-pass the chute 24. However, when it is desired to return the clippings to the ground by closing the gate 41, then the stripper plate is elevated into the solid line position shown in FIG. 5, and the flange 48 of the gate 41 lies flush with the deflector plate 46.

In operation, the grass clippings are blown upwardly into the chute 24 and deflected by the curved portion 27 into the top portion of the receptacle 12. Then they settle down into the lower portion of the receptacle. Some of the air stream will escape through the screen bottom 35, and some will escape forwardly above the curved portion 27. The opening between the cross member **36*a* and the curved portion 27 permits the operator to see when the receptacle is filled, the leaf level when it is higher than the edge of the curved portion 27 giving this indication. Then the operator pulls the rope 50 tilting the receptacle 12 into the discharge position of FIG. 2 in which the clippings are discharged. The slope of the bottom wall 34,** facilitates the sliding movement of the clippings along the bottom wall incident to the discharge.

The center of gravity of the receptacle 12, when empty, is located rearwardly and below the pivot point 40, with the result that the receptacle is suspended from the pivots 40 so that the front edge of the bottom member 34 will swing against a portion of the housing 23, as shown in FIG. 1. Gravity will tend to maintain these parts in the closed position, and the weight of the clippings as they build up within the receptacle 12 tends to increase the force in which the front edge of bottom grid member 34 engages the housing. Preferably the parts are so dimensioned that the front transverse member of the grid 34 engages the housing 23 right beneath rear transverse member 15.

By using a flail type rotor as a mowing element, it is possible to throw the clippings upwardly a substantial distance, thus permitting the use of a receptacle having a substantial vertical dimension. For instance, in a mower three feet wide and constructed in the proportions shown in the drawings, and in which the vertical members 31 are substantially 4 feet high, it is possible to provide a receptacle capacity of substantially 24 cubic feet.

Various flail type blades may be used, such as the wide blades shown in my Pat. No. 3,092,946, but I prefer to use the light weight rod stock type blade shown in the aforesaid copending application because it reduces the overall weight of the mower to a very substantial extent, and the additional weight is not required in lawn, park and golf course use.

Such blades 28 are formed from a blank of high carbon steel circular rod stock bent to provide a shank which is parallel to the axis of the rotor and pivotally connected to the rotor, and a diagonally disposed extension, the extension having a forwardly facing cutting edge. Since these rod stock type blades 28 have a comparatively small surface area, the pivotally mounted paddles 29 are employed to create an air stream having a force sufficient to lift the entrained clippings up to the top of the receptacle 12.

The disclosure of the aforesaid copending application is hereby incorporated by reference into this application insofar as said disclosure is consistent with the teachings of this application.

Preferably, a guard 51 is provided which depends from the front cross rail 14 to reduce the hazard of sticks and stones being thrown forwardly beneath the front housing portion 22.

The mower may be made of any suitable width, such as 3 feet, or 6 feet for greater lawn expanses, and the principles of my invention are also applicable to a self propelled mower which is guided by a handle.

During operation with the gate 41 closed, the blades 28 will chop leaves into finer particles when the deflector 46 is in its extended position than when the deflector is retracted. Then the gate 41 can be opened and the mower driven over the previously chopped leaves to pick them up and blow them into the receptacle 12.

Due to the slope of the bottom wall 34, 35, the rocking of the receptacle 12 withdraws support from the clippings contained within the basket without elevating the mass of clippings as a whole. Thus only a very small force on the rope 50 is required to discharge the clippings.

Although only a preferred embodiment of the present invention has been described herein, it will be understood that various modifications and changes may be made in the construction shown without departing from the spirit of the invention, as pointed out in the appended claims.

I claim:

1. A mower comprising a mobile frame including side walls, a flail type rotor assembly journalled in said side walls for rotation about a transverse axis and arranged to discharge grass clippings upwardly in a substantially vertical direction, a housing for said rotor assembly having an outlet located above said rotor assembly, means providing a chute extending upwardly from said outlet to receive the grass clippings discharged vertically therefrom, a grass catching receptacle having an upper portion located to receive grass clippings from said chute and being pivotally suspended from said side walls at a point forwardly and above the center of gravity of said receptacle, said chute providing means including a front wall and a rearwardly spaced baffle, said baffle and the rear portion of said housing cooperating with said receptacle to provide an enclosed space for holding said grass clippings, and said receptacle including a bottom front edge portion which normally engages said rear housing portion, whereby said receptacle may be rocked so that said bottom front edge portion moves rearwardly away from said rear housing portion to provide a discharge opening.

2. A mower as claimed in claim 1 in which said baffle and said rear housing portion provides the front wall of said enclosed space with said bottom front edge portion of said receptacle being free of any substantial vertical wall portion whereby rocking movement of said receptacle will not require any substantial horizontal or upward displacement of the clippings adjacent said discharge opening.

3. A mower as claimed in claim 2 in which said receptacle has a bottom wall which is inclined forwardly and downwardly toward said front edge portion.

4. A mower as claimed in claim 2 in which the height of said receptacle is substantially greater than its front-to-back dimension.

5. A mower as claimed in claim 1 which includes a gate for said outlet, said gate being normally open and when in closed position causing said grass clippings to pass beneath said rear housing portion for discharge onto the ground.

6. A mower as claimed in claim 5 including a deflector plate adjustably mounted on said baffle.

7. A mower as claimed in claim 5 in which said receptacle is removably mounted on said side walls to permit removal of same when said gate is closed.

8. A mower as claimed in claim 5 in which said front wall has an opening at its lower end, said gate when in open position overlying said opening and closing same.

9. A mower as claimed in claim 1 which includes a draw bar for connection to a tractor, and a rope connected to said upper receptacle portion for rocking same from a point forwardly of said draw bar.

10. A mower as claimed in claim 1 in which said flail type rotor assembly includes a plurality of blades pivotally mounted on said drum, a plurality of non-cutter paddle elements pivotally mounted on said drum for increasing the force of the air stream provided by said rotor assembly, said air stream passing through said chute-providing means and carrying said grass clippings entrained therein upwardly into said upper portion of said receptacle.

11. A mower as claimed in claim 4 in which said front wall extends upwardly beyond the upper edge of said baffle and has a curved upper portion for deflecting said grass clippings rearwardly.

* * * * *